United States Patent [19]

Silver

[11] Patent Number: 4,978,553

[45] Date of Patent: Dec. 18, 1990

[54] METHOD OF MAKING LOW-FAT BUTTER OR MARGARINE SPREAD AND RESULTING PRODUCT

[76] Inventor: Jules Silver, 7 Ridgewood Rd., Niantic, Conn. 06357

[21] Appl. No.: 115,767

[22] Filed: Nov. 2, 1987

[51] Int. Cl.$^5$ .................. A23C 15/02; A23D 7/00
[52] U.S. Cl. ........................... 426/603; 426/581; 426/804
[58] Field of Search ............... 426/603, 804, 581, 585, 426/586, 587

[56] References Cited

U.S. PATENT DOCUMENTS

| | | | |
|---|---|---|---|
| 3,922,376 | 11/1975 | Strinning et al. | 426/603 |
| 4,020,186 | 4/1977 | Edwards . | |
| 4,091,121 | 5/1978 | Hawley | 426/603 |
| 4,497,834 | 2/1985 | Barta . | |
| 4,515,825 | 5/1985 | Moran et al. | 426/603 |
| 4,606,926 | 8/1986 | Wiles et al. | 426/603 |

OTHER PUBLICATIONS

Kalab et al., Milk Gel Structure, XV, Electron Microscopy of Whey Protein Based Cream Cheese Spread, Milchwissenschaft, 40(4), pp. 193–196 (1985).
Kalab et al., Development of Microstructure in Cream Chese Based Queso Blanco Cheese, Food Microstructure, vol. 4 (1985), pp. 89–98.

*Primary Examiner*—Marianne Cintins
*Attorney, Agent, or Firm*—Burd, Bartz & Gutenkauf

[57] ABSTRACT

A method for the preparation of a low-fat butter or margarine product for use as a table spread. The product is prepared by plasticizing a composition containing from about 15% to about 50% lipid, preferably butter fat; an amount of protein, preferably dairy protein, sufficient to emulsify the lipid but insufficient to stabilize the lipid against plasticization; and from about 40% to about 60% moisture. Salt, butter coloring and butter flavoring are preferably also included. The plasticization is achieved by subjecting the composition to the high speed cutting action of a sharp bladed food comminuter for a period of time sufficient to plasticize the composition. The product is a smooth plastic spreadable butter substitute containing nutritious protein, which is low in fat and does not require the need for emulsifiers and stabilizers. The product is spreadable immediately after removal from refrigeration, as well as at normal room temperatures.

24 Claims, No Drawings

METHOD OF MAKING LOW-FAT BUTTER OR MARGARINE SPREAD AND RESULTING PRODUCT

BACKGROUND OF THE INVENTION

1. Field of the Invention

This invention relates to a method for the production of a smooth, homogeneous, spreadable, protein enriched, low-fat butter or margarine product for use as a table spread, and the resultant low-fat product. The method is characterized by a high speed cutting action step to cause rupture of fat globules which obviates the need for emulsifiers for fat stability or stabilizers to prevent undesirable syneresis.

Butter has long been used as a spread for breads and other foods as well, as in cooking for enhancement of flavor. Butter can be prepared by churning high fat cream until the fat separates out as butter. Since butter is high in cholesterol, non-cholesterol-containing margarine has risen in popularity as a butter substitute for health reasons. Margarine has many disadvantages, such as a high fat content, as well as a greasy mouth feel and taste. They also contain numerous chemicals and other additives.

It is desirable and the principal object of this invention to prepare a butter or margarine product which is low in fat and cholesterol, which is nutritious and which provides organoleptic characteristics more akin to butter.

2. The Prior Art

No prior art is known which discloses or suggests the production of a low-fat butter or margarine product by use of a high speed cutting action to rupture fat globules and eliminate the need for emulsifiers and stabilizers. The following references relate to somewhat analogous methods of producing dairy based food products including the addition of fat to a dairy-based protein composition and blending and/or homogenizing of the mixture.

In *Milk Gel Structure, XV. Electron Microscopy of Whey Protein Based Cream Cheese Spread*, M. Kalab et al, *Milchwissenschaft*, 40 (4) pp. 193–196 (1985), there is disclosed a method for making the cream cheese spread from Ricotta cheese and cultured high fat cream blended using a Polytron blender and homogenizer. Although some of the products may contain protein, fat and moisture within the ranges of the product of this invention, the process resulted in a relatively coarse microstructure (p. 194, col. 2, last paragraph) and lacked the ruptured fat globules.

In *Development of Microstructure in a Cream Cheese Based Queso Blanco Cheese*, M. Kalab et al, *Food Microstructure*, Vol. 4 (1985), pp. 89–98, there is disclosed a method for making cream cheese prepared from cultured high fat cream and Queso Blanco cheese curd (acid precipitated from milk) followed by homogenization. Mixing of the curd with the cultured cream in a Polytron blender resulted in relatively large particle sizes which were gritty (pp. 94 and 97, as well as FIG. 9). Homogenization resulted in the disintegration of the protein particles (page 97 and FIG. 14). Cream cheese made from Queso Blanco cheese is not as spreadable as cream cheese made from Ricotta Cheese (page 97, col. 1, 11th line from bottom).

In Barta U.S. Pat. No. 4,497,834, there is disclosed a dairy based food product prepared from partially delactosed condensed milk solids having the proportion of solids substantially the same as in the final product. Fat may be added up to 40% of the weight of the final product. This material is cooked until a gel is formed following which the material is agitated and blended to form a smooth homogeneous product. A small amount of a stabilizer is desirably included to prevent syneresis and a small amount of an emulsifier is desirably included for fat emulsification.

Edwards U.S. Pat. No. 4,020,186 discloses a Ricotta type cheese prepared by acidifying skim milk, separating the whey from the so formed coagulum and balancing the fat level with cream. The mixture is then comminuted, such as by pumping the mixture through a partially closed valve, to provide the proper texture for the Ricotta type cheese. This low-fat cheese product could be a starting material for the process of the present invention.

The present invention is based on the discovery that a low-fat spreadable butter or margarine product can be prepared from a dairy base without the need for emulsifiers and stabilizers by subjecting the ingredients to high speed cutting action to rupture the fat globules.

SUMMARY OF THE INVENTION

Broadly stated, the invention is directed to a method for the production of a smooth homogeneous spreadable low-fat butter or margarine product which comprises first forming a relatively dry moisture-containing admixture of an edible protein composition and animal or vegetable fat, the admixture containing at least enough protein sufficient to emulsify the fat but less than the amount of protein which stabilizes the fat against plasticization, from about 15% to about 50% fat, and about 40% to 60% moisture. Thereafter, the admixture is plasticized by subjecting it to high speed cutting action at a temperature between about 35 degrees F. (2 degrees C.) and 100 degrees F. (38 degrees C.) to cause a rupture of the fat globule membranes. The cutting action is continued for a time from at least about 1 to 20 minutes sufficient to form a homogeneous plastic mass which is spreadable at both usual refrigerator and normal room temperature. The invention includes the resulting product.

DETAILED DESCRIPTION OF THE PREFERRED EMBODIMENT

The edible protein ingredient of the butter or margarine product is preferably of dairy origin. The dairy protein can be derived from whole milk, partially defatted milk, skim milk, filled milk, casein, alkali metal caseinates, cheese curd, whey protein including whey protein concentrate (above about 25% protein) delactosed whey and demineralized whey solids, dried whey, non-fat milk solids, and the like, and mixtures thereof. The dairy protein composition can contain, in addition to dairy solids, vegetable proteins such as soy protein isolate, and fillers such as starch. Margarine products may be based solely on vegetable protein.

The amount of protein ranges from about 8% and above and is present in an amount at least sufficient to emulsify the fat or lipid but less than about 14% so as to be insufficient to stabilize the fat globule membrane against rupturing under plasticizing conditions. Preferably, the protein is present in the final product in amount between about 8% and 13%.

Because of lactose intolerance and graininess caused by crystallization, the lactose content of the dairy protein product used is preferably reduced below an amount that would crystallize in the final product, i.e., below about 15% by weight of the final product, and preferably to as low as possible to avoid lactose intolerance problems. If the dairy protein source is precipitated casein, e.g., cheese, the lactose is easily removed with the whey. The cheese can be made by any known process for cheese curd formation, including enzyme conversion of lactose to lactic acid or direct acidification with food grade acids, such as phosphoric or acetic acids. In order to avoid tart or acidic flavor notes from entering the product, the curding method preferably produces a sweet curd (pH of about 6–6.5) rather than an acid curd. Acid curds can be used by elevating the pH to about pH 6–6.5 with food grade base, such as sodium hydroxide.

When using a dairy source other than cheese, the dairy product is blended with other materials such as edible proteins in an amount sufficient to reduce the lactose content of the dairy protein composition to the desired limit, or the lactose can be removed physically or chemically. Hydrolysis of the lactose with lactase enzyme is an effective means for essentially removing the lactose. Separation of the lactose by molecular sieve resin or ultrafiltration can also be used. These latter processes have the benefit of also removing large amounts of water, thereby concentrating the milk protein simultaneously. Thermal and/or vacuum evaporation can also be used to condense the protein, usually after delactosing.

The protein should be denatured so as not to harden in the final product. Heating to about 180 degrees F. (82 degrees C.) for at least about twenty minutes to coprecipitate the whey with casein for processing. If the protein source is heated in processing, as by pasteurization, evaporation or condensing of milk, or by heating a cheese curd, further denaturing is not necessary.

Fat is added to the protein composition to the desired fat content of the final butter or margarine product. The fat content is adjusted to an amount sufficient to provide a smooth spreadable product upon plasticization. The fat content of the final composition on a weight basis is at least about 15%, preferably the fat ranges from about 20% to about 40%, and most preferably from about 22% to about 28% by weight. Fat content is based on solvent soluble lipid. Milk containing varying amounts of fat is an effective starting material. The fat content of the milk can be augmented by the addition of other sources of butter fat such as from butter oil, butter, high fat cream, plastic cream, or, for a margarine product, a non-dairy fat, i.e., vegetable oil such as corn oil, cottonseed oil, peanut oil, sunflower oil, safflower oil, palm oil, coconut oil, soybean oil, and the like, either singly or in combination. In some instances, where high fat cheese curd is used as the protein source, no added fat is required.

For enhanced flavor for a butter product, butterfat is the preferred lipid source. Desirably at least half of the added fat is in the form of butterfat, and preferably from 75% to 100% of the added fat is butterfat. Any remainder can be from other fat sources such as animal fat and vegetable oils, either liquid or hardened such as by partial hydrogenation. Butterfat should be melted and added in the liquid state.

The protein source for a margarine product can be or include a compatible dairy protein. Alternatively, the protein may be a vegetable protein, preferably a vegetable protein which is derived from the same source as the non-dairy lipid, such as soy isolate, coconut isolate, cottonseed isolate, and the like.

The composition prior to processing has a moisture content ranging from about 60% and below so as to form a relatively dry product. Preferably, the moisture content ranges from about 40% to about 60% by weight. In the case of dry ingredients, the moisture can be added as water. Moisture can also be added as part of the ingredients, such as by the use of milk. In using protein-containing sources having a large amount of water, such as milk or cheese, it may be necessary to blend the protein with sufficient dry ingredients, or remove sufficient water to achieve the desired moisture level.

The blended mixture is converted into a homogeneous plastic mass upon severe cutting, as described in detail hereinafter. The addition of moisture, where needed, occurs during blending prior to cutting, or the blending and cutting can occur simultaneously.

Salt may be included in the final composition in an amount sufficient for flavoring, e.g., up to about 1.5%. Other commercially available flavorings and colorings can also be added, such as natural butter flavoring and carotene for coloring. The addition of 5% modified potato starch allows the low fat butter product to be freeze-thaw stable.

After thorough blending of the components of the composition of the invention, the composition is plasticized by subjecting the composition to the cutting action of a device which can rupture the fat globule membrane of the lipid component of the material. High speed cutting of the fat globules causes a tearing and ripping of the fat globule membrane from the fat cell wall and spreading out of the contained fat. The casein micelles, alpha-lactoalbumin and beta-lactoglobulin are believed to bind to the milk fat at the interface of the milk fat and protein. The action causes formation of a stable oil in protein and water emulsion. The cutting or slicing of the fat globule increases the surface areas of the fat particles giving more surface area for the protein to react with and bind to. This protein-fat interaction forms a stable emulsion without the addition of stabilizers or emulsifiers.

The proteins, casein, alpha-lactoalbumin and beta-lacto globulin have water binding ability which enables them to bind the free water that is in the low fat emulsion. The proteins also have an affinity for the fat globule if there is no emulsifier added to the system, adding to the stability of the emulsion. Emulsifiers tend to destabilize the fat globule and reduce the binding of milk protein to the fat. The uniqueness of the present invention is the high speed cutting of the proteins and lipids increasing the surface area and causing greater interaction between the two phases of protein and lipid without the use of emulsifiers and stabilizers.

The cutting action is carried out in commercially available processing equipment fitted with sharp cutting blades adapted for high speed rotation. This processing step is conducted for a period of time sufficient to convert the substantially dry blend of protein and lipid to a smooth plastic spreadable mass. Cutting times depend on the type of equipment used, the speed of the cutting blade, the efficiency of the cutting action and the amount of material processed. Batch style food processors equipped with arcuate sigmoid or S-shaped blades arrayed for rotation in a horizontal plane and spaced apart vertically have been used successfully. Usual rotation speeds are from about 2000 to 6000 RPM and the protein-fat mixture has been subjected to cutting action for at least about 5 to 20 minutes. Commercially available high capacity food comminuting machines utilizing vertically arrayed blades are designed for rotation at speeds up to 13500 RPM. At such higher speeds residence times may be lower, at least about ⅛ to 5 minutes. COMITROL comminuting machines sold by Urschel Laboratories Incorporated of Valpariso, Id. are exemplary. Such equipment is available for both batch and continuous operation.

Homogenization is a treatment by which fat globules of milk are uniformly dispersed throughout the milk to prevent separation of the lighter cream upon standing. Homogenization is a relatively more gentle treatment of the fat globules than the cutting action of the present invention and does not result in tearing and ripping of the fat globule membrane.

Transition electron photo micrographs of products of the invention have shown that the membranes of the fat globules are ruptured and discontinuous such that the fat membrane is not encompassing the fat globule. A product similarly treated to an extended cutting action but having a greater amount of protein sufficient to stabilize the fat membrane against tearing did not show such rupturing.

The product may be packaged in the same manner and using the same equipment as conventional butter and margarine products. The products of the present invention are spreadable immediately upon removal from the refrigerator, unlike most butter.

The invention is illustrated in the examples which follow. As used herein, all percentages are by weight based on the total weight of the final composition unless otherwise stated.

EXAMPLE 1

At room temperature 200 grams of cheese curd (22 grams butterfat-11%) prepared by direct acidification of whole milk having an adjusted pH within the range of from about 5.8-6.0 were blended with 55 grams melted butter (44 grams butterfat-80%), one gram salt, ⅛ drop carotene (30% carotene in palm oil), and 2 drops commercial butter flavor (JAY NV 5991). This product had a butter fat content of 25.8% and protein content of 12.7%. It was then subjected to the cutting action of a sigmoid shaped two level cutting blade in an Oskar (Sunbeam) food processor at speed 3000 RPM for 15 minutes. The product before cutting had a solids content of about 50% and was almost dry to the touch. After cutting the mass became liquid and had a smooth plastic appearance. Upon chilling and crystallization of the fat the product had the look, appearance, taste and spreadability approximating butter, while providing better nutritional values and less than about 70% of the fat of normal butter.

EXAMPLE 2

To 720 milliliters of fresh whole milk, the milk fat content of which was about 5.5% (39.6 grams) was added 60 milliliters of fresh cream (36% butterfat-21.6 grams). The initial fat content of the mixture was 7.8%. 5 milliliters of a 10% glacial acetic acid solution was slowly added to the milk under continuous agitation to avoid forming pockets of high acidity. The titratable acidity was brought to about 0.3% as related to lactic acid. The acidified milk was admixed with about 1.5 grams of salt slowly sprinkled into the mixture. The mixture was continuously agitated for 4-5 minutes.

After thorough mixing of the milk mixture, the mixture was then heated to about 190 degrees F. (80 degrees C.) in a double boiler to prevent burning of the protein. After 15-20 minutes of cooking, the mixture was examined for precipitation. At the initial formation of precipitate or curd, all agitation was halted allowing the milk to remain quiescent for 15-25 minutes. The curd particles became firm and coalesced rising to the surface of the whey. The curd was separated from the whey and the curd pressed to remove further quantities of whey. No additional fat was incorporated because of the high fat content of the curd of 23.4%. The protein content was 11.8%. This product which can be described as having a substantially dry appearance was subjected to high speed cutting action as described in Example 1 for 5 minutes until a creamy paste was formed. Yellow coloring and 0.5 grams salt were then added. Cutting was continued for an additional 5-10 minutes to form an acceptable butter spread.

EXAMPLE 3

200 grams Ricotta cheese containing part skim milk (11.3% butterfat-22.6 grams) was squeezed between 4 layers of cheese cloth. The cheese was blended with 55 grams of melted slightly salted butter (80% butterfat-44 grams), 1 gram salt, 2 drops carotene in palm oil (30% carotene) and 2 drops butter flavor. This composition was subjected to cutting action as in Example 1 for approximately 15 minutes. The product initially was dry but after plasticization the product was liquid and set up upon cooling. It contained 26% fat and 12.7% protein. The buttery taste was acceptable. (The amount of color was excessive and could be halved, or more.)

EXAMPLE 4

A similar product was prepared from 125 grams (50% moisture) of Ricotta squeezed in cheese cloth, 46 grams (70% moisture) unsqueezed Ricotta, 30 grams instant dry skim milk powder, 2 drops butter flavor, 1 gram salt and 60 grams melted butter (48 grams butterfat-80%). After approximately 15 minutes of cutting as in Example 1, the product was liquified. It set up upon cooling but had a somewhat off taste (possibly from the dry milk powder or the butter, which was old). The fat content was 25.1%. The protein content was 14.8%.

The products of Examples 3 and 4 were viewed under transition electron microscopy using the procedure as described by M. Kalab et al, in the article entitled *Milk Gel Structure XV*, etc., cited above. The product of Example 3 was smooth and had a uniform matrix when compared to the product of Example 4. In the product of Example 3 there were noted areas where the protein clusters were not as compact as the product of Example 4 made in a similar manner but with a greater proportion protein. Of most importance, the product of Example 3 showed the fat globule membranes were not intact, and were torn, ruptured and not encircling the fat. In contrast, in the product prepared with more protein, the fat is encased in fat globule membranes that are intact. In the product of Example 3, the fat globule membranes are broken allowing the fat to spread. The transmission electron photo micrographs show that the product of Example 3 depends on a critical amount of protein relative to the fat in order to obtain the desired plasticized compositions of the invention.

EXAMPLE 5

One thousand milliliters of whole milk (3.8% butterfat-3.5% protein) are concentrated on an ultrafiltration membrane to about 45% solids. The concentrated milk is then heated to 190 degrees to 200 degrees F. (88 degrees to 93 degrees C.) for 20 minutes under conditions which will not scorch the milk. Twenty-two grams of butter oil are added to provide a final product with a butterfat content of about 25%. The protein content is about 10.5%. Salt, food coloring and butter flavoring are added to the mixture. After cooling to room temperature, the mixture is subjected to the cutting action of a sigmoid blade as described in Example 1 to provide a creamy spreadable product which does not require emulsifiers or stabilizers.

EXAMPLE 6

A low fat butter product is prepared from a sweet curd drained to 50 to 55% moisture and cut with sharp signoid blades for 15 minutes at 3000 RPM. Butter oil is added to yield desired 25% butterfat in the finished product. Salt to taste, carotene and natural butter flavor are added. The mass is subjected again to cutting action for a further 10 minutes.

It is apparent that many modifications and variations of this invention as hereinbefore set forth may be made without departing from the spirit and scope thereof. The specific embodiments described are given by way of example only. The the invention is limited only by the terms of the appended claims.

I claim:

1. A method for the production of a smooth homogeneous spreadable low-fat butter or margarine product for use as a table spread which comprises:
   (A) forming a relatively dry moisture-containing admixture of an edible protein and animal or vegetable fat said admixture containing at least about 8% protein which is sufficient to emulsify the fat to less than 14% protein which is sufficient to stabilize the fat against plasticization, from about 15% to about 50% fat, and about 40% to 60% moisture,
   (B) plasticizing said admixture by subjecting said admixture to high speed sharp blade cutting action to cause a rupture of the fat globule membranes to form a homogeneous plastic mass which is spreadable both immediately upon removal from the refrigerator and at room temperature.

2. A method according to claim 1 wherein salt, butter coloring and butter flavoring are included in the admixture.

3. A method according to claim 1 wherein said protein is a dairy-based protein.

4. A method according to claim 3 wherein said animal fat is butterfat.

5. A method according to claim 1 wherein said protein is present in amount between about 8% and 13% and said fat is present in amount between about 22% and 28%.

6. A method according to claim 1 wherein the product is a butter substitute, the protein is a dairy-based composition, said animal fat is butterfat and the admixture includes salt, butter coloring and butter flavoring.

7. A method according to claim 6 wherein said protein is present in amount between about 8% and 13% and said fat is present in amount between about 22% and 28%.

8. A method according to claim 7 wherein the butter or margarine product contains about 5% modified potato starch.

9. A method according to claim 3 wherein said dairy-based protein is a Ricotta cheese.

10. A smooth homogeneous spreadable low-fat butter or margarine product for use as a table spread prepared according to the method of claim 1.

11. A smooth homogeneous spreadable low-fat butter substitute prepared according to the method of claim 6.

12. A smooth homogeneous spreadable low-fat butter substitute prepared according to the method of claim 7.

13. A smooth homogeneous spreadable low-fat butter substitute prepared according to the method of claim 8.

14. A smooth homogeneous spreadable low-fat butter or margarine product for use as a table spread which comprises a relatively dry moisture-containing admixture of an edible protein and animal or vegetable fat, said admixture containing at least about 8% to less than about 14% protein to maintain the fat dispersed in a uniform homogeneous emulsion, from about 15% to about 50% fat, and about 40% to 60% moisture, said fat being characterized by rupture of the fat globule membranes and spreading out of the fat from the fat globules. being characterized by rupture of the fat globule membranes and spreading out of the fat from the fat globules.

15. The product of claim 14 wherein salt, butter coloring and butter flavoring are included in the admixture.

16. The product of claim 14 wherein said protein is a dairy-based protein.

17. The product of claim 16 wherein said animal fat is butterfat.

18. The product of claim 14 wherein said protein is present in amount between about 8% and 13% and said fat is present in amount between about 22% and 28%.

19. The product of claim 14 wherein the product is a butter substitute, the protein is a dairy-based protein, said animal fat is butter fat and the admixture includes salt, butter coloring and butter flavoring.

20. The product of claim 19 wherein said protein is present in amount between about 8% and 13% and said fat is present in amount between about 22% and 28%.

21. The product of claim 20 wherein the product contains about 5% potato starch.

22. The product of claim 16 wherein said dairy-based protein is a Ricotta cheese.

23. A method for the production of a smooth homogeneous spreadable low-fat butter or margarine product for use as a table spread which comprises:
   (A) forming a relatively dry moisture-containing admixture of an edible protein and animal or vegetable fat, said admixture containing at least about 8% protein which is sufficient to emulsify the fat to less than about 14% protein which is sufficient to stabilize the fat against plasticization, from about 15% to about 50% fat, and about 40% to 60% moisture;
   (B) plasticizing said admixture to cause a rupture of the fat globule membranes to form a homogeneous plastic mass which is spreadable both immediately upon removal from the refrigerator and at room temperature.

24. A smooth homogeneous spreadable low-fat butter or margarine product for use as a table spread prepared according to the method of claim 23.

* * * * *

UNITED STATES PATENT AND TRADEMARK OFFICE
CERTIFICATE OF CORRECTION

PATENT NO. : 4,978,553

DATED : December 18, 1990

INVENTOR(S) : Jules Silver

It is certified that error appears in the above-identified patent and that said Letters Patent is hereby corrected as shown below:

Column 7, line 40, after "than" insert --- about ---.

Column 8, delete lines 25 and 26.

Signed and Sealed this

First Day of September, 1992

Attest:

DOUGLAS B. COMER

*Attesting Officer*     *Acting Commissioner of Patents and Trademarks*